(12) United States Patent
Bae

(10) Patent No.: US 8,946,573 B2
(45) Date of Patent: Feb. 3, 2015

(54) KEY ASSEMBLY, ROTARY INPUT DEVICE USING THE KEY ASSEMBLY, AND ELECTRONIC DEVICE USING THE ROTARY INPUT DEVICE

(75) Inventor: Kuem-jong Bae, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 300 days.

(21) Appl. No.: 13/410,634

(22) Filed: Mar. 2, 2012

(65) Prior Publication Data

US 2013/0056335 A1    Mar. 7, 2013

(30) Foreign Application Priority Data

Sep. 7, 2011   (KR) .................. 10-2011-0090736

(51) Int. Cl.
| | | |
|---|---|---|
| *H01H 9/00* | (2006.01) | |
| *H01H 19/62* | (2006.01) | |
| *H01H 27/00* | (2006.01) | |
| *H01H 25/04* | (2006.01) | |
| *G03B 17/02* | (2006.01) | |

(52) U.S. Cl.
CPC ............. *H01H 25/041* (2013.01); *G03B 17/02* (2013.01); *H01H 2025/048* (2013.01)
USPC ...................................................... 200/17 R

(58) Field of Classification Search
CPC ..... H01H 13/00; H01H 19/00; H01H 19/001; H01H 19/003; H01H 19/025; H01H 19/10; H01H 19/14; H01H 2019/00; H01H 2221/01
USPC ...... 200/17 R, 336, 179, 19.07, 19.11, 19.18, 200/19.19, 36, 410, 412, 510, 310, 341, 200/11 TW
See application file for complete search history.

(56) References Cited

U.S. PATENT DOCUMENTS

| | | | | |
|---|---|---|---|---|
| 5,369,230 | A | * | 11/1994 | Misawa ...................... 200/52 R |
| 7,091,430 | B1 | * | 8/2006 | Haizima et al. ............... 200/6 A |
| 7,140,551 | B2 | * | 11/2006 | de Pauw et al. ................. 236/94 |
| 2002/0166754 | A1 | * | 11/2002 | Ohba et al. ........................ 200/4 |
| 2005/0224322 | A1 | * | 10/2005 | Kikuya et al. .............. 200/11 R |
| 2007/0163814 | A1 | | 7/2007 | Won |
| 2008/0011590 | A1 | * | 1/2008 | Montalvo et al. ........... 200/11 R |

FOREIGN PATENT DOCUMENTS

| | | |
|---|---|---|
| KR | 1020070075634 A | 7/2007 |
| KR | 1020100104047 A | 9/2010 |

* cited by examiner

*Primary Examiner* — Renee Luebke
*Assistant Examiner* — Anthony R. Jimenez
(74) *Attorney, Agent, or Firm* — Drinker Biddle & Reath LLP

(57) ABSTRACT

A key assembly including a base; a central button portion disposed on the base to move between a remote position and an adjacent position with respect to the base, and including a protrusion that protrudes outward along an edge of the central button portion; and a rotary button portion combined with the base, including a hole for externally exposing at least a portion of a side of the central button portion, rotatably disposed on outer side of the central button portion, and including a suppressing portion that is formed on an inner side of the hole to correspond to the protrusion to suppress movement of the central button portion in a direction away from the base. A rotary input device including the key assembly, and an electronic device including the rotary input device.

16 Claims, 5 Drawing Sheets

KEY ASSEMBLY, ROTARY INPUT DEVICE USING THE KEY ASSEMBLY, AND ELECTRONIC DEVICE USING THE ROTARY INPUT DEVICE

CROSS-REFERENCE TO RELATED PATENT APPLICATION

This application claims the benefit of Korean Patent Application No. 10-2011-0090736, filed on Sep. 7, 2011, in the Korean Intellectual Property Office, the entire disclosure of which is incorporated herein by reference.

BACKGROUND

1. Field of the Invention

The invention relates to a key assembly and a rotary input device using the key assembly, and more particularly, to a key assembly having improved durability and a rotary input device using the key assembly.

2. Description of the Related Art

The functions offered on electronic devices such as a portal digital camera have become numerous. For example, users may select image-capturing functions such as exposure time, flash options, and many other options related to image capturing. Additionally, electronic devices such as portable terminals or navigation devices may offer the user the opportunity to select entertainment functions such viewing a video or listening to music. Moreover, the user may select to use the electronic device for common functions such as making a phone call, sending or receiving a text message, or providing road guidance.

All of these possible functions mean many possible selections for the user. Often, the electronic device includes many buttons to enable selection of one of these functions. But, many buttons makes it difficult for the user to learn and use the electronic device. Moreover, the manufacturers of the electronic devices may not include some functions desired by the user because it creates too many selections for the user to chose from. Additionally, often buttons provided on electronic device fail under repeated use.

SUMMARY

Therefore, there is a need in the art, for a key assembly having improved durability and a rotary input device using the key assembly, and an electronic device including the rotary input device using the key assembly.

There is provided a key assembly including a base; a central button portion disposed to move between a remote position and an adjacent position with respect to the base, and comprising a protrusion that protrudes outward along an edge of the central button portion; and a rotary button portion configured to combine with the base, and comprising a hole for externally exposing at least a portion of a side of the central button portion, wherein the rotary button portion is rotatably disposed on an outer side of the central button portion, and comprises a suppressing portion that is formed on an inner side of the hole to correspond to the protrusion to suppress movement of the central button portion in a direction away from the base.

The protrusion may protrude in a direction from an area of the central button portion toward the rotary button portion, and the suppressing portion may be configured to protrude toward the central button portion to contact a surface of the protrusion when the central button portion moves in a direction away from the base.

The suppressing portion may include a flange portion that protrudes toward the protrusion, and the protrusion may include a flange groove that corresponds to the flange portion.

The suppressing portion may extend along an inner circumferential surface of the hole.

A plurality of the suppressing portions may be disposed along an inner circumferential surface of the hole and spaced apart from one another.

The central button portion may include an inclination-resistance protrusion disposed on a surface of the central button portion that faces the base.

A plurality of the inclination-resistance protrusions may be disposed on a surface of the central button portion that faces the base and spaced apart from one another.

The central button portion may include elastic portions that are elastically deformed and are configured to support the inclination-resistance protrusion.

The central button portion may be disposed between the rotary button portion and the base.

The rotary button portion may include a plurality of combination protrusions, and the base may further include a plurality of holes, and the rotary button portion may be configured to be combined with the base by inserting the plurality of combination protrusions through the plurality of holes.

A rotary input device is disclosed. The rotary input device may include a substrate on which a switch for generating a signal in response to external manipulation is disposed; a base disposed on the substrate to be rotatable with respect to the substrate; a central button portion disposed to move between a remote position and an adjacent position with respect to the base, for pressing the switch to generate the signal, and comprising a protrusion that protrudes outward along an edge of the central button portion; and a rotary button portion combined with the base, and comprising a hole for externally exposing at least a portion of a side of the central button portion, wherein the rotary button portion is rotatably disposed on an outer side of the central button portion, and comprises a suppressing portion that is formed on an inner side of the hole to correspond to the protrusion to suppress movement of the central button portion in a direction away from the base.

The substrate may include a first switch that is disposed at a position corresponding to the central button portion and that is configured to generate a signal when the central button portion moves toward the base.

The base may include a pressing portion that extends in a circumferential direction of the base and that protrudes toward the substrate, and the substrate may include a plurality of second switches that are disposed in a region corresponding to the pressing portion and the second switches may be configured to generate a signal in response to a press of the pressing portion.

The rotary input device may include a rotary portion that may be disposed between the substrate and the base, and that may be rotatably mounted on the substrate, and that ma support the base, and that may have an opening in its central portion.

The rotary input device may include a guide portion that may be disposed at a position corresponding to the opening between the central button portion and the substrate, and that may support the central button portion, and that may deliver a pressing power of the central button portion due to external manipulation to the switch.

The substrate may include a rotary sensor portion that generates a signal according to a rotation angle of the rotary portion.

A photographing apparatus is disclosed. The photographing apparatus includes a rotary input device including a substrate on which a switch for generating a signal in response to external manipulation is disposed; a base disposed on the substrate to be rotatable with respect to the substrate; a central button portion disposed to move between a remote position and an adjacent position with respect to the base, for pressing the switch to generate the signal, and comprising a protrusion that protrudes outward along an edge of the central button portion; and a rotary button portion combined with the base, and comprising a hole for externally exposing at least a portion of a side of the central button portion, wherein the rotary button portion is rotatably disposed on an outer side of the central button portion, and comprises a suppressing portion that is formed on an inner side of the hole to correspond to the protrusion to suppress movement of the central button portion in a direction away from the base.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Hereinafter, the invention will be described in detail by explaining exemplary embodiments of the invention with reference to the attached drawings.

As used herein, the term "and/or" includes any and all combinations of one or more of the associated listed items.

Figure 1:
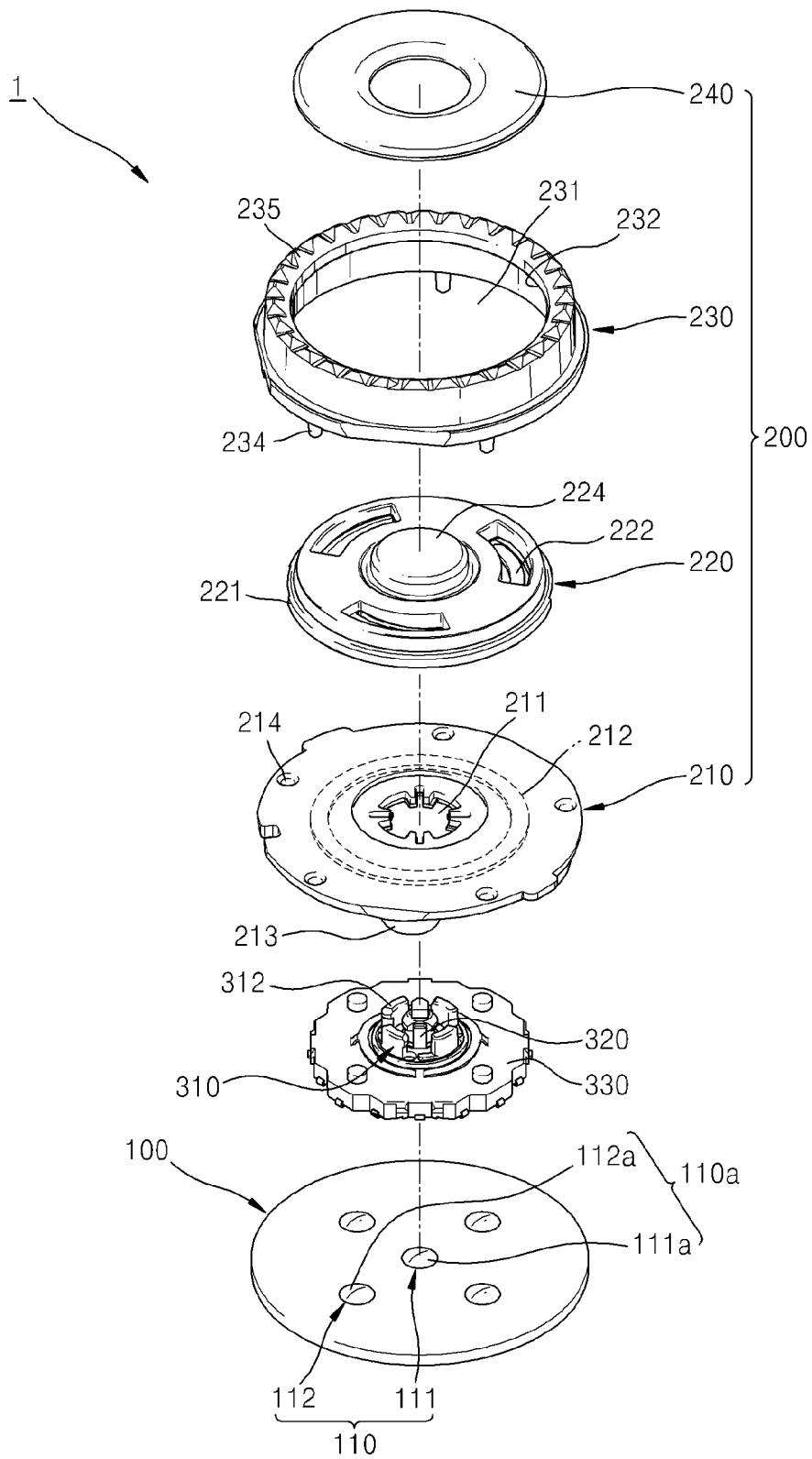
FIG. 1 is an exploded view illustrating an example of configuration elements of a rotary input device according to an embodiment of the invention.
Figure 2:
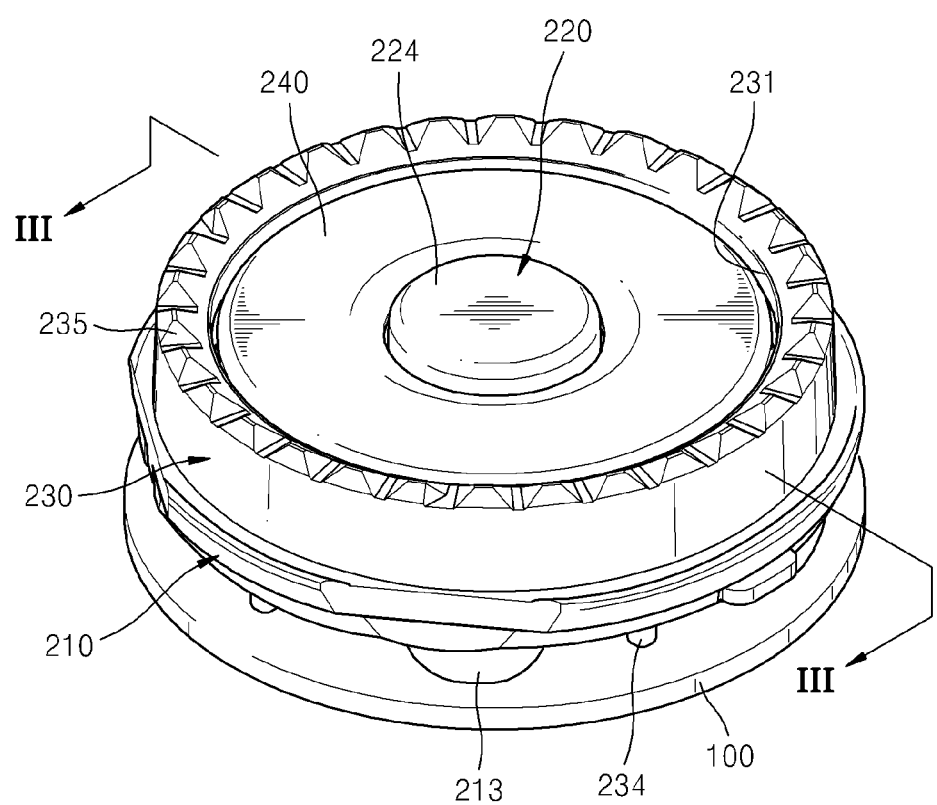
FIG. 2 is a perspective view of the rotary input device in which the components shown in FIG. 1 are coupled each other.
Figure 3:
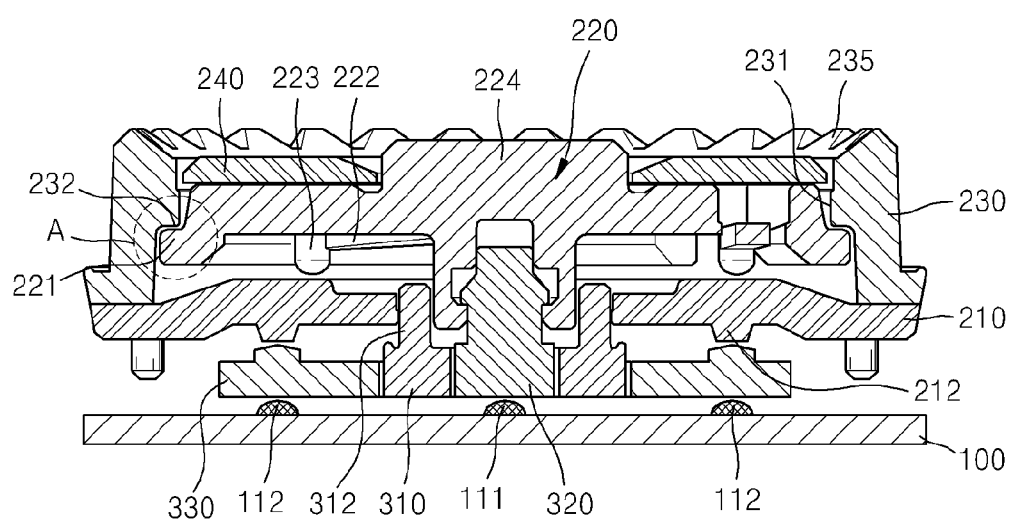
FIG. 3 is a cross-sectional view of the rotary input device of FIG. 1, taken along a line III-III of FIG. 2.

FIG. 1 is an exploded view illustrating configuration elements of an example of a rotary input device 1 according to an embodiment of the invention. FIG. 2 is a perspective view of the rotary input device 1 in which the components shown in FIG. 1 are coupled each other. FIG. 3 is a cross-sectional view of the rotary input device 1, taken along a line III-III of FIG. 2.

The rotary input device 1 of FIGS. 1 through 3 includes a substrate 100 and a key assembly 200. The key assembly 200 includes a base 210, a central button portion 220 that is disposed to move between a remote position and an adjacent position with respect to the base 210, and a rotary button portion 230 that is combined with the base 210 and is rotatably disposed on an outer side of the central button portion 220.

A switch 110 is disposed on the substrate 100 to generate a signal in response to external manipulation, e.g., a press. The switch 110 according to the current embodiment includes a first switch 111 that is disposed to correspond to the central button portion 220, and 4 second switches 112 that are separated from each other at regular intervals around the first switch 111. However, the number of switches in the switch 110 or an array shape of the switches in the switch 110 is not limited thereto.

The substrate 100 may be a flexible printed circuit board (FPCB). Each of the switch 110 disposed on the substrate 100 is formed of a contact portion (not shown) that are patterned on the substrate 100, and a dome sheet that are formed of a metal and correspondingly surround the contact portions. When one dome sheet is pressed, the dome sheet and its corresponding contact portion are connected and thus a signal is generated.

In an embodiments, a rotary portion 310 for supporting the base 210 and having an opening in its central portion is disposed on the substrate 100, and a guide portion 320 for supporting the central button portion 220 is disposed at a position corresponding to the opening. A supporting portion 330 may be disposed at an outer side of the rotary portion 310 to support the rotary portion 310 and the guide portion 320.

The rotary portion 310 is rotatably mounted on the substrate 100 and supports the base 210. That is, in embodiments, the base 210 includes combination holes 211, and the combination holes 211 are combined with combination protrusions 312 that are disposed surrounding the opening of the rotary portion 310, and thus the base 210 rotates together with the rotary portion 310.

The substrate 100 includes a rotary sensor portion (not shown) that generates a signal according to a rotation angle of the rotary portion 310. The rotary sensor portion may be embodied in one of various forms, e.g., as a magnetoresistive sensor (MR sensor). That is, a magnetic scale in which N-poles and S-poles are alternately disposed is disposed on a circumferential region of a surface of the rotary portion 310 that faces the substrate 100, and a movement distance of the magnetic scale, that is, the rotation angle of the rotary portion 310, may be detected by a sensor disposed on the substrate 100 to correspond to the magnetic scale.

In embodiments, the guide portion 320 is disposed at the position that corresponds to the opening of the rotary portion 310 and is between the central button portion 220 and the base 210, and supports the central button portion 220 to allow the central button portion 220 to move between the remote position and the adjacent position with respect to the base 210. When the central button portion 220 is disposed at the adjacent position with respect to the base 210 in response to external manipulation, e.g., a press, the guide portion 320 delivers a pressing power to the substrate 100, and thus a dome sheet 111a arranged in the first switch 111 is pressed and then is connected with its corresponding contact portion, thereby generating a signal. The guide portion 320 may be combined with the central button portion 220.

In embodiments, the base 210 is supported by the rotary portion 310 and includes a pressing portion 212 extending in a circumferential direction of the base 210 and protruding toward the substrate 100. The substrate 100 includes the second switches 112, which are disposed at positions corresponding to the pressing portion 212 and each of the second switches 112 generate a signal in response to a press by the pressing portion 212. The four second switches 112 may be disposed at regular intervals around the first switch 111.

The rotary portion 310, the base 210 combined with the rotary portion 310, and the rotary button portion 230 combined with the base 210 rotate together in a clockwise direction or in a counter clockwise direction with respect to the substrate 100 and the central button portion 220, and are disposed to be inclined toward the substrate 100 with respect to a rotation axis in response to external manipulation.

Here, the supporting portion 330, which is disposed between the substrate 100 and the base 210 to support the rotary portion 310 and the guide portion 320, delivers a pressing power due to inclination of the base 210 toward the substrate 100.

Since, in embodiments, the pressing portion 212 is formed on a surface of the base 210 that faces the substrate 100, if the base 210 presses an area where one second switch 112 is disposed, in response to external manipulation, a pressing power is delivered to the substrate 100 via the guide portion 320, and thus a corresponding one of second dome sheets 112a arranged in each of the second switches 112 is connected with its corresponding contact portion, and thus a signal is generated. In order to prevent the substrate 100 from being damaged due to excessive inclination of the base 210, a buffering protrusion 213 may be further arranged on a circumferential region of the surface of the base 210 that faces the substrate 100.

In embodiments, the central button portion 220 is disposed on the base 210, and the rotary button portion 230, which includes a hole 231 for externally exposing at least a portion of a side of the central button portion 220, is rotatably disposed at the outer side of the central button portion 220. In order to facilitate rotation manipulation, in embodiments, the rotary button portion 230 includes uneven portions 235 that are formed along a circumferential region of a surface of the rotary button portion 230 that faces outward.

Here, the central button portion 220 is combined with the base 210, thereby being supported by the base 210. The base 210 and the rotary button portion 230 may be combined in a manner in which combination holes 214 and combination protrusions 234 are combined with each other, wherein the combination holes 214 are separated from each other along a circumferential region of the base 210, and the combination protrusions 234 are formed on the rotary button portion 230 to correspond to the combination holes 214. However, one or more embodiments of the invention are not limited thereto, and thus the base 210 and the rotary button portion 230 may be combined by using an adhesive, bolts and nuts, or the like.

Referring to FIG. 3, the central button portion 220 includes a protrusion 221 that protrudes outward along an edge of the central button portion 220, and the rotary button portion 230 includes a suppressing portion 232 that is formed on an inner side of the hole 231 and corresponding to the protrusion 221 to suppress movement in a direction away from the base 210.

The central button portion 220 may move between the remote position and the adjacent position with respect to the base 210, and the rotary button portion 230 may be rotatable with respect to the central button portion 220, and thus the central button portion 220 may not be combined with the base 210 and/or the rotary button portion 230 by using an adhesive, bolts and nuts, or the like. Thus, the central button portion 220 may be easily detached due to a shock.

According to the current embodiment, the protrusion 221 formed on the central button portion 220 protrudes toward the rotary button portion 230, and the suppressing portion 232 formed on the rotary button portion 230 protrudes toward the central button portion 220 to contact a surface of the protrusion 221 when the central button portion 220 moves in a direction away from the base 210.

Thus, due to the suppressing portion 232, the protrusion 221 may not move to a position that is further distant from the base 210 than a position where the protrusion 221 contacts the suppressing portion 232. Therefore, due to the suppressing portion 232, it is possible to prevent the central button portion 220 from being externally detached.

Here, the suppressing portion 232 may extend along an inner circumferential region of the hole 231 of the rotary button portion 230, or a plurality of the suppressing portions 232 may be disposed separated from each other.

A plurality of inclination-resistance protrusions 223 may be disposed on a surface of the central button portion 220 that faces the base 210. If the central button portion 220 is inclined toward the base 210, when the rotary button portion 230 disposed on the outer side of the central button portion 220 rotates, rotation may not be uniform over an entire region, and the rotary button portion 230 may not rotate in parallel with the substrate 100, and thus a rotation angle may not be exactly detected.

Thus, by disposing the inclination-resistance protrusions 223 on the central button portion 220, inclination of the central button portion 220 with respect to the base 210 is prevented, and thus rotation reliability may be improved. This will be described below.

The central button portion 220 has the side that is externally exposed by the hole 231 formed in the rotary button portion 230, and a portion of the exposed side includes a manipulation unit 224 that protrudes outward to facilitate external manipulation. The manipulation unit 224 may be disposed at a position corresponding to the guide portion 320 and the first switch 111.

A cover 240 may be disposed on an area other than an area corresponding to the manipulation unit 224 externally exposed by the hole 231. Diagrams or letters regarding menus that correspond to the second switches 112, respectively, may be printed on positions of the cover 240 that correspond to the second switches 112, respectively.

Figure 4:
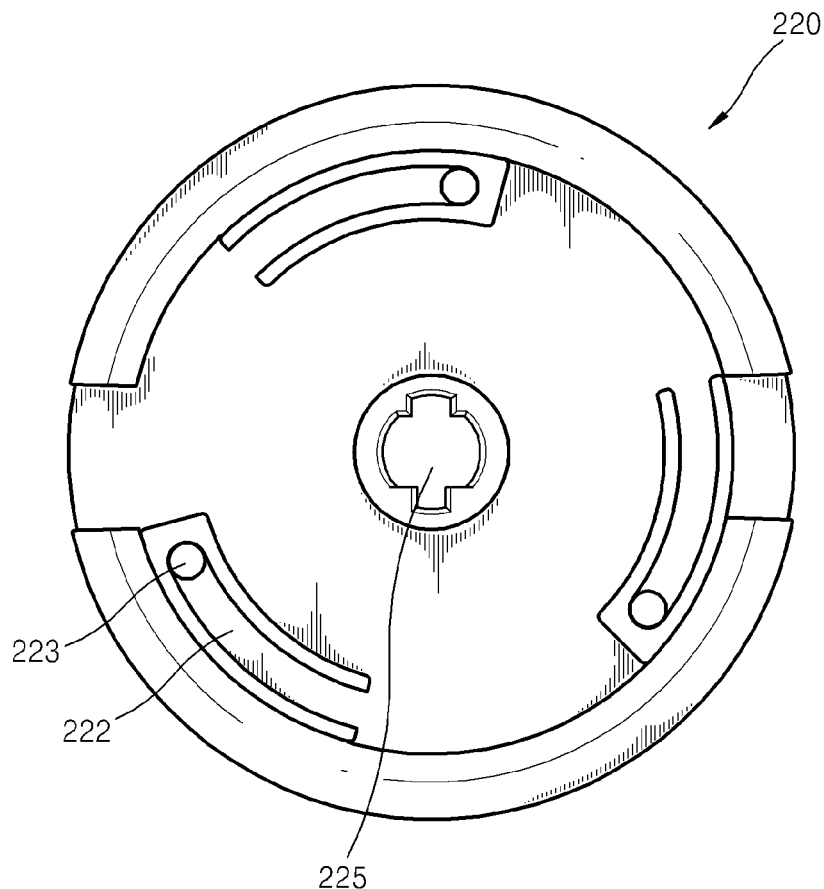
FIG. 4 is a plane view illustrating a surface of a central button portion that faces a base and is included in the rotary input device of FIG. 1.

FIG. 4 is a plane view illustrating a surface of the central button portion 220, which faces the base 210 and is included in the rotary input device 1 of FIG. 1.

The inclination-resistance protrusions 223 are disposed at regular intervals on the surface of the central button portion 220 that faces the base 210. According to the current embodiment, the number of inclination-resistance protrusions 223 is three, but one or more embodiments of the invention are not limited thereto and thus the number of inclination-resistance protrusions 223 may be greater than or less than three.

The central button portion 220 may include elastic portions 222 that are elastically deformed and supports the inclination-resistance protrusions 223. Since the central button portion 220 moves between the remote position and the adjacent position with respect to the base 210, in order to prevent the movement of the central button portion 220 from being limited by the inclination-resistance protrusions 223, the inclination-resistance protrusions 223 are supported by the elastic portions 222.

Each of the elastic portions 222 has a thin stick form that extends from a main body of the central button portion 220, and is elastically movable in up and down directions with respect to a position parallel with the main body. However, one or more embodiments of the invention are not limited thereto and thus the elastic portions 222 may be embodied as springs or rubber disposed on the surface of the central button portion 220 that faces the base 210.

A coupling groove 225 to be coupled with the guide portion 320 (refer to FIG. 3) may be disposed on a center portion of the surface of the central button portion 220 that faces the base 210.

Figure 5:
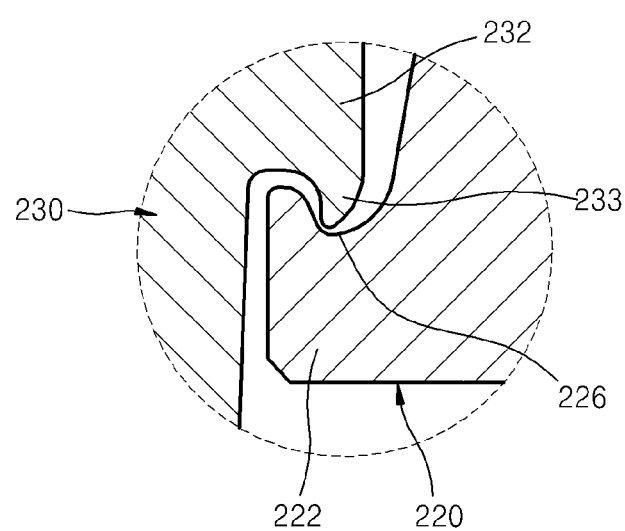
FIG. 5 is a cross-sectional view illustrating another embodiment of a region A of FIG. 3.

FIG. 5 is a cross-sectional view illustrating another embodiment of a region A of FIG. 3.

Referring to FIG. 5, the suppressing portion 232, which protrudes from the rotary button portion 230 toward the central button portion 220, includes a flange portion 233 at its edge, and the protrusion 221, which protrudes from the central button portion 220 toward the rotary button portion 230, includes a flange groove 226 corresponding to the flange portion 233.

The flange portion 233 is inserted into the flange groove 226.

Thus, due to the suppressing portion 232, the protrusion 221 may not move to a position that is further distant from the base 210 (refer to FIG. 3.) than the position where the protrusion 221 contacts the suppressing portion 232. Also, the protrusion 221 and the suppressing portion 232 are flange-combined, and thus the central button portion 220 may not be externally detached even if a relatively strong external shock is applied thereto.

Figure 6:
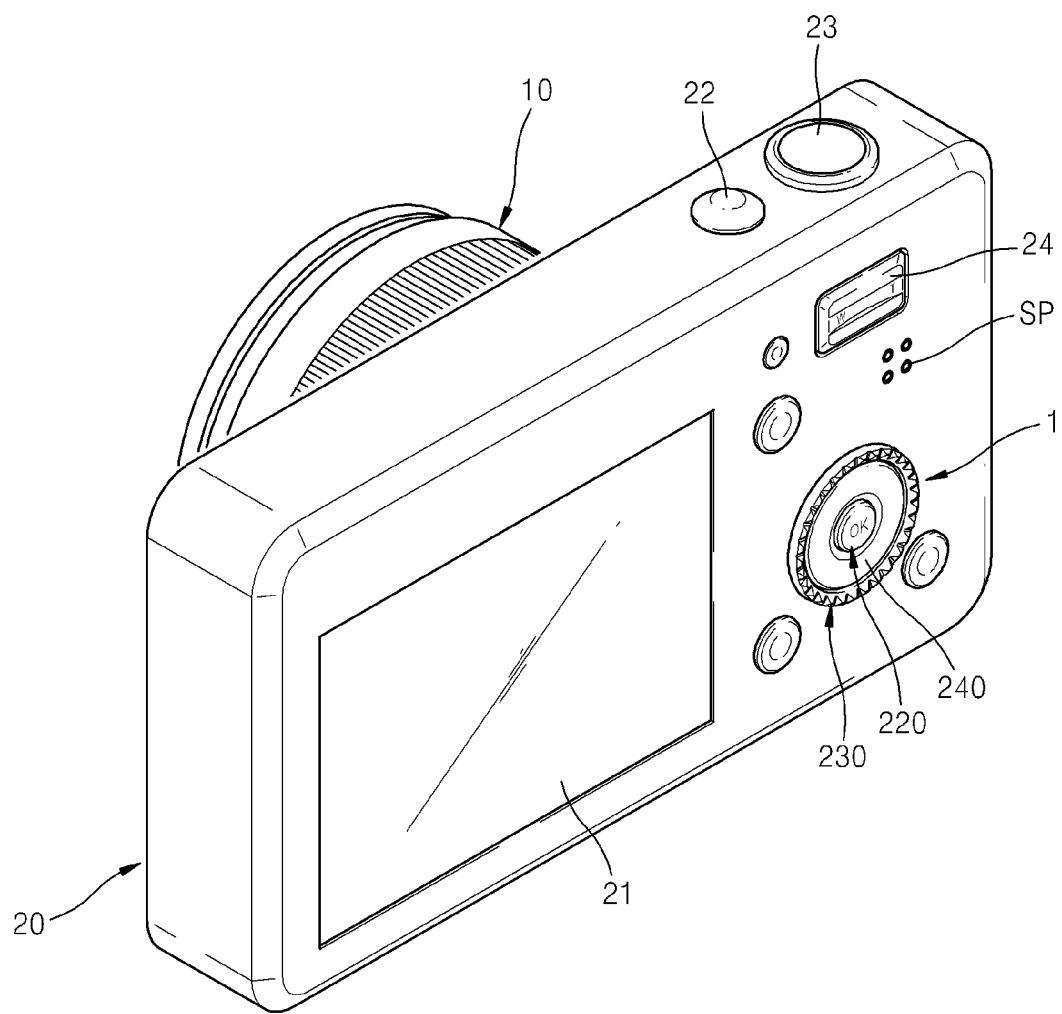
FIG. 6 is a schematic perspective view illustrating an example of a photographing apparatus including the rotary input device of FIG. 1, according to an embodiment.

FIG. 6 is a schematic perspective view illustrating an example of a photographing apparatus including the rotary input device 1 of FIG. 1, according to an embodiment of the invention.

The image-capturing apparatus according to the current embodiment includes a barrel assembly 10 including an optical system, and a main body 20 including an imaging device (not shown) and a control unit (not shown). On a surface of the main body 20 that is opposite to a surface in which the barrel assembly 10 is disposed, a display unit 21, a zoom button 24, and the rotary input device 1 are disposed.

A shutter-release button 23 for opening or closing a shutter for a predetermined time period to expose the imaging device to light, a power switch 22 for performing power-on/off operations, and the like may be disposed on the main body 20.

The substrate 100 (refer to FIG. 1.) included in the rotary input device 1 of FIG. 1 is disposed in the main body 20, and is electrically connected to the control unit, which exchanges control signals with components included in the photographing apparatus to control operations of the components of the photographing apparatus, or processes data.

The rotary input device 1 includes the central button portion 220, which is externally exposed, the rotary button portion 230, and the cover 240. A user rotates the rotary button portion 230 in order for the user to instruct a shift between various menus for performing functions of the photographing apparatus, to sequentially move a plurality of captured images displayed on the display unit 21, or to execute a menu that has been shifted to by pressing the central button portion 220.

Also, the user may press an edge of the rotary button portion 230 in to select a specific menu. In this regard, for user convenience, diagrams showing menus that correspond to the second switches 112, respectively, may be printed on the cover 240.

Signals that are generated by manipulating the rotary input device 1 are delivered to the control unit, and then the control unit delivers the signals to the components of the photographing apparatus.

In the current embodiment, the rotary input device 1 is applied to the photographing apparatus, but the invention is not limited thereto and thus the rotary input device 1 may be applied to other electronic devices including a portable terminal, a navigation device, or the like.

The key assembly and the rotary input device using the key assembly according to the one or more embodiments of the invention may have improved durability and may prevent inclination of the button portion so that reliability of the rotation of the key assembly may be improved.

For the purposes of promoting an understanding of the principles of the invention, reference has been made to examples illustrated in the drawings, and specific language has been used to describe these embodiments. However, no limitation of the scope of the invention is intended by this specific language, and the invention should be construed to encompass all embodiments that would normally occur to one of ordinary skill in the art.

The particular implementations shown and described herein are illustrative examples of the invention and are not intended to otherwise limit the scope of the invention in any way. For the sake of brevity, conventional electronics, control systems, software development, and other functional aspects of systems (and components of individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections, may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

What is claimed is:

1. A key assembly comprising:
   a base;
   a central button portion disposed to move between a remote position and an adjacent position with respect to the base, and comprising:
   a protrusion that protrudes from an area of the central button portion outward along an edge of the central button portion; and
   a caved flange groove that protrudes from the central button portion outward having a caved portion; and
   a rotary button portion configured to combine with the base, and comprising a hole for externally exposing at least a portion of a side of the central button portion, wherein the rotary button portion is rotatably disposed on an outer side of the central button portion, and comprises:
   a suppressing portion that is formed on an inner side of the hole to correspond to the protrusion to suppress movement of the central button portion in a direction away from the base, wherein the suppressing portion is configured to protrude toward the central button portion to contact a surface of the protrusion when the central button portion moves in a direction away from the base; and
   a pointed flange portion that corresponds to the caved flange groove.

2. The key assembly of claim 1, wherein the suppressing portion extends along an inner circumferential surface of the hole.

3. The key assembly of claim 1, wherein a plurality of the suppressing portions are disposed along an inner circumferential surface of the hole and spaced apart from one another.

4. The key assembly of claim 1, wherein the central button portion comprises an inclination-resistance protrusion disposed on a surface of the central button portion that faces the base.

5. The key assembly of claim 4, wherein a plurality of inclination-resistance protrusions are disposed on a surface of the central button portion that faces the base and spaced apart from one another.

6. The key assembly of claim 4, wherein the central button portion comprises elastic portions that are elastically deformed and are configured to support the inclination-resistance protrusion.

7. The key assembly of claim 1, wherein the central button portion is disposed between the rotary button portion and the base.

8. The key assembly of claim 1, wherein the rotary button portion further comprises a plurality of combination protrusions, and the base further comprises a plurality of holes, and the rotary button portion is configured to be combined with the base by inserting the plurality of combination protrusions through the plurality of holes.

9. A rotary input device comprising:
a substrate on which a switch for generating a signal in response to external manipulation is disposed;
a base disposed on the substrate to be rotatable with respect to the substrate;
a central button portion disposed to move between a remote position and an adjacent position with respect to the base, for pressing the switch to generate the signal, and comprising:
a protrusion that protrudes from an area of the central button portion outward along an edge of the central button portion; and
a caved flange groove that protrudes from the central button portion outward having a caved portion; and
a rotary button portion combined with the base, and comprising a hole for externally exposing at least a portion of a side of the central button portion, wherein the rotary button portion is rotatably disposed on an outer side of the central button portion, and comprises:
a suppressing portion that is formed on an inner side of the hole to correspond to the protrusion to suppress movement of the central button portion in a direction away from the base, wherein the suppressing portion is configured to protrude toward the central button portion to contact a surface of the protrusion when the central button portion moves in a direction away from the base; and
a pointed flange portion that corresponds to the caved flange groove.

10. The rotary input device of claim 9, wherein the substrate comprises a first switch that is disposed at a position corresponding to the central button portion and that is configured to generate a signal when the central button portion moves toward the base.

11. The rotary input device of claim 9, wherein the base comprises a pressing portion that extends in a circumferential direction of the base and that protrudes toward the substrate, and wherein the substrate comprises a plurality of second switches that are disposed in a region corresponding to the pressing portion and the second switches are configured to generate a signal in response to a press of the pressing portion.

12. The rotary input device of claim 9, further comprising a rotary portion that is disposed between the substrate and the base, that is rotatably mounted on the substrate, that supports the base, and that has an opening in its central portion.

13. The rotary input device of claim 12, further comprising a guide portion that is disposed at a position corresponding to the opening between the central button portion and the substrate, that supports the central button portion, and that delivers a pressing power of the central button portion due to external manipulation to the switch.

14. The rotary input device of claim 12, wherein the substrate comprises a rotary sensor portion that generates a signal according to a rotation angle of the rotary portion.

15. An electronic device, comprising:
a rotary input device comprising:
a substrate on which a switch for generating a signal in response to external manipulation is disposed;
a base disposed on the substrate to be rotatable with respect to the substrate;
a central button portion disposed to move between a remote position and an adjacent position with respect to the base, for pressing the switch to generate the signal, and comprising a protrusion that protrudes from an area of the central button portion outward along an edge of the central button portion; and a caved flange groove that protrudes from the central button portion outward having a caved portion; and
a rotary button portion combined with the base, and comprising a hole for externally exposing at least a portion of a side of the central button portion, wherein the rotary button portion is rotatably disposed on an outer side of the central button portion, and comprises a suppressing portion that is formed on an inner side of the hole to correspond to the protrusion to suppress movement of the central button portion in a direction away from the base, wherein the suppressing portion is configured to protrude toward the central button portion to contact a surface of the protrusion when the central button portion moves in a direction away from the base; and a pointed flange portion that corresponds to the caved flange groove.

16. The electronic device of claim 15, wherein the electronic device is a photographing apparatus.

* * * * *